United States Patent Office 2,847,872
Patented Aug. 19, 1958

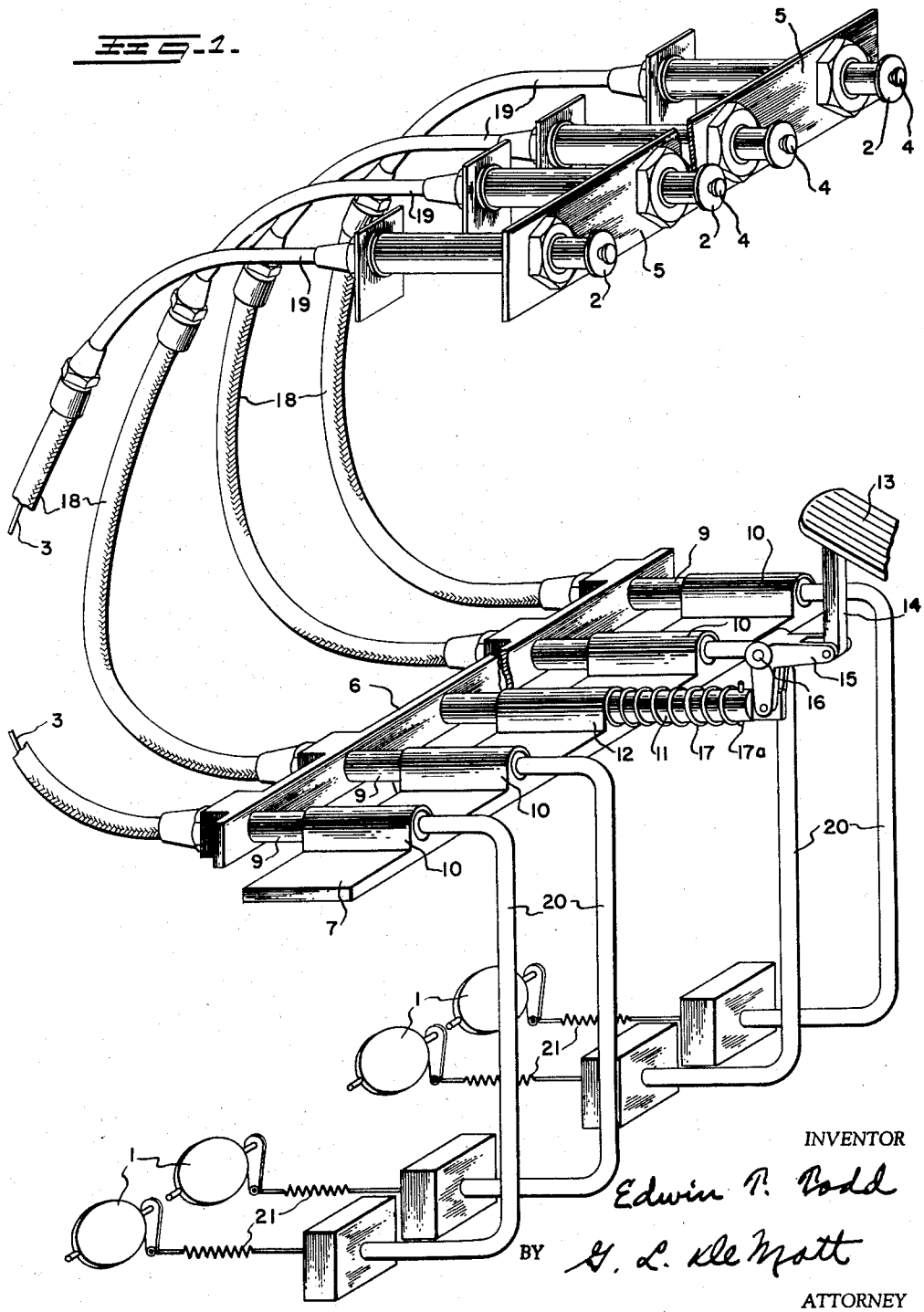

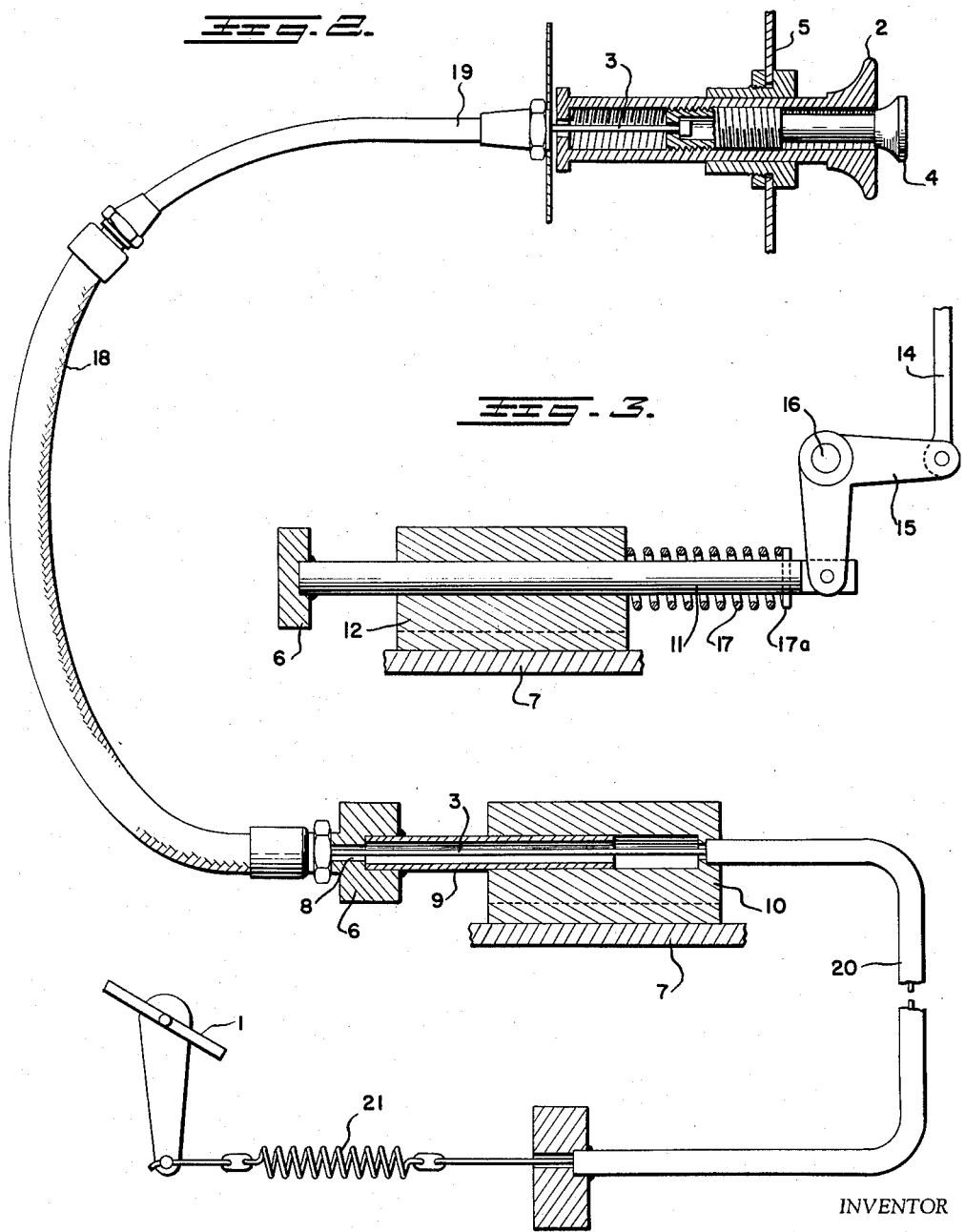

2,847,872

ADJUSTABLE PLURAL CONTROL DEVICE

Edwin T. Todd, Pontiac, Mich., assignor to General Motors Corporation, Detroit, Mich., a corporation of Delaware Application November 30, 1955, Serial No. 549,927

7 Claims. (Cl. 74—478)

This invention relates to a control arrangement providing means for adjusting each of several elements individually to permit relative adjustments between them, and providing additional means for uniformly regulating the elements in unison while preserving the relative adjustments between them.

The present invention is particularly suitable for use in controlling the power output of multi-engined vehicles. In such vehicles the cooperating engines must be synchronized to provide substantially equal power output. In the case of water, air, or other dirigible vehicles, such synchronization obviates the need to maintain the course of the vehicle by means of constant manipulation of the steerage mechanism. Further, the control of such vehicles is greatly facilitated by a control means which increases or decreases the overall power output by uniformly regulating the cooperating engines in unison without necessitating thereafter a readjustment or a resynchronization of the engines.

It is accordingly an object of this invention to provide a control arrangement for synchronizing the cooperating engines of a multi-engined vehicle by means of individual adjustments for each engine wherein the cooperating engines can also be uniformly regulated in unison in a manner preserving synchronization.

Heretofore, various solutions have been presented for uniformly regulating two controllable elements in unison while providing for a differential adjustment between them. Such proposals have been inherently limited to use with only two controllable elements, and the operating principles used have not been susceptible to adaptation for use with more than two controllable elements. Such proposals further place a restriction on the latitude of individual control afforded each controllable element susceptible to unified regulation.

Thus, it is a further object of this invention to provide a versatile control arrangement of this type which is easily adapted for use with any number of controllable elements or mechanisms.

Furthermore, the various previous solutions have so related the individual control to the master control that separating them so as to place the individual controls on a dash for convenient hand manipulation and the master control in a convenient position for operation by a foot pedal has been either impossible or unavoidably complex.

Therefore, it is also an object of this invention to provide a control arrangement as described wherein the individual adjustments of the controllable elements can be made at a point remote from the unified master control, to facilitate operation by the operator.

Previous control arrangements have utilized differential screw threads, gear arrangements, and levers provided with eccentric cams to effect synchronization and simultaneous control. These solutions have necessitated expensive and costly manufacture and have not solved the problems mentioned before.

It is also an object of this invention to provide a control arrangement adapted to synchronize a plurality of elements and further to regulate them simultaneously, utilizing an arrangement consisting of a plurality of wires in which each wire is surrounded for a portion of its length by a flexible sheath, the relationship of the wire and the sheath being such that each wire may have axial movement independently of its sheath but is constrained to move with the sheath when the sheath is flexed and moved axially.

Other objects and advantages of the present invention will become apparent from a perusal of the detailed description hereinafter set forth.

In the drawings: Figure 1 is an isometric view of the preferred embodiment of the invention. Figure 2 shows the preferred embodiment in cross section. Figure 3 shows the actuating means in cross section.

It is understood that the present invention is not limited to the details of construction and arrangement of parts illustrated in the accompanying drawings since the invention is capable of many modifications and arrangements.

Referring to Figure 1, elements to be controlled by the subject system are shown as carburetor butterfly valves 1. The system is not limited to use with any specific controllable element, it being within the purview of this invention to control other devices such as, fuel supply valves as used on turbine power plants, ailerons, etc. Each controllable element 1 is connected to an individual control means or knob 2 by a control wire 3. The term wire as used in the claims means either a single wire or a relatively stiff strand of wires, although the single wire is the preferred usage. The individual control means may be any kind of conventional push-pull arrangement and may incorporate a twist lock (not shown) to fix the control in any given position. The individual control means may also incorporate a vernier adjusting means 4 for making very fine adjustments. A suggested individual control for use in this arrangement is the type shown in the patent to Boyce et al. 2,262,448. In the preferred form of the invention as shown, the individual controls are located on a dash 5 for convenient hand manipulation.

The master control means comprises a movable cross head 6 which is axially slidable relative to a fixed cross head 7. The transverse portion of the movable cross head is provided with apertures 8, as shown in Figure 2, through which the individual wires extend. As shown, a number of sleeve elements 9 are firmly attached to the movable cross head in axial alignment with the apertures and telescopically engage corresponding guides 10 mounted on the fixed cross head 7. The purpose of these telescopic elements is to provide an axially aligned sliding relationship between the fixed and movable cross heads and to provide protection for the wires extending therethrough.

An actuating member 11 is attached normal to the central portion of the movable cross head and slidably engages a guide member 12 on the fixed cross head.

To actuate the movable cross head through the member 11 a hinged or pivoted foot pedal 13 is provided. The hinged foot pedal is pivoted at one end to a floor board (not shown) and provided with a dependent arm 14 which is pivotally attached at the lower end to one arm of a bell crank 15. The other arm of the bell crank is pivotally attached to the actuating member 11. The central portion of the bell crank is adapted to pivot about a fixed pin 16. A return spring 17 surrounds the actuating member 11 between the guide member 12 and the retaining pin 17a. This spring returns the actuating arm and pedal to an initial position. A return spring may be located in positions other than the one shown.

For example, a compression spring could be located under the pedal.

A portion of the length of each control wire is surrounded by a flexible sheath 18. One end of the sheath is attached to a rigid conduit 19 in a manner preventing axial movement of the end of the sheath. The other end of the sheath is attached to the movable cross head 6 for axial movement therewith. The arrangement of the sheath between the movable cross head and fixed portion must be such that movement of the movable cross head will not only move the sheath axially, but further will cause the sheath to flex. It has been found to be particularly efficient to provide the flexible sheath with one bowed portion as is shown in the drawings.

The basic principle of this arrangement is that a control wire within its flexible housing or sheath can be moved axially without causing appreciable movement of the sheath, but axial movement of one end of the bowed flexible sheath results in a flexure of the sheath which constrains the wire therein to move axially with the sheath. Various types of flexible sheaths and wires can be used in this arrangement. Representative of the type of sheath particularly suited for use herein are the sheaths shown in the patents to Kurney 1,970,702 and Bratz 2,187,873.

In the arrangement shown in the drawing, the axial movement of the movable cross head 6 causes the flexible sheaths 18 to flex and the bowed portions of the sheaths, and wires therein, to increase or decrease in radius in a manner which does not exert appreciable force upon the individual control means, but which does exert an axial force on a portion of the wires therein, causing them to move axially equal distances to uniformly regulate the corresponding elements in unison. In the preferred embodiment shown in Figure 1 the sheaths are of equal length and of substantially equal radius in the bowed portions.

A safety spring 21 may be inserted in each individual control line at any point between the master control and the controllable element to protect the controllable element from damage in the case of master control overtravel. As shown in Figure 2, the safety spring is located at a point near the controllable element.

This arrangement is very easily adapted to control any number of elements in that only an additional knob, wire, and sheath need be added to accommodate each additional element.

The control arrangement operates in the following manner:

When the individual controls 2 are in the initial position—as shown in the drawings this position would place each knob adjacent the dash—the butterfly valves 1 will be at an initial position which we will arbitrarily call zero degrees of adjustment.

Each knob will move the corresponding butterfly valve through the desired angle of adjustment by means of the wire interconnecting them. When the engines are synchronized, i. e., when the engines are producing substantially equal power output, the positions of the butterfly valves usually vary in the amount of angular adjustment according to the characteristics of the corresponding engine. Thus, the valve for the first engine may occupy the position of 5° of adjustment, the second 12°, the third 8° and the fourth 15°, etc.

When it is desired to increase the overall output of the cooperating engines, the foot pedal 43 is actuated causing the movable cross head to move axially to the left, as viewed in the drawings. This movement flexes the sheaths in the bowed portions causing the wires therein to be "gripped" and moved axially. The wires are moved equal distances in response to the movement of the movable cross head, and this results in a uniform increase in the angular adjustment of each butterfly valve. Thus, if the unified regulation by the master control results in a 5° increase in the position of each valve, the first valve will then occupy a position of 10°, the second 17°, the third 13°, the fourth 20°, etc. Thus, the relative difference between the position of the first valve and the second valve will remain 7°, between the second and the third 4°, the third and fourth 7°, etc. Insofar as the function of power and butterfly valve position for each engine is a linear one and the rates of change of the engines are equal the basic synchronization of the engines will be preserved throughout the range of foot pedal actuation.

What is claimed is:

1. In a control arrangement, a fixed cross head, a movable cross head, a foot operated means for causing axial movement of said movable cross head in relation to said fixed cross head, a plurality of units, each unit comprising a controllable element, individual hand control means for controlling the element, a wire extending between each controllable element and the individual control means through the movable cross head and the fixed cross head, and a flexible sheath surrounding a length of the wire between the individual control means and the movable cross head; said individual control means adapted to move said wires independently of said sheaths, said sheaths being fixed against axial movement at one end and attached to said movable cross head at the other end, each sheath including a bow between the ends, whereby actuation of the foot operated means adjusts the controllable elements in unison preserving the relative adjustments of said elements made by the hand control means and permitting independent adjustment of the controllable elements by said hand control means.

2. In a control arrangement, a fixed cross head, an axially movable cross head, a foot operated means for causing axial movement of said movable cross head in relation to said fixed cross head, a plurality of units; each unit comprising a controllable element, individual hand control means for controlling the elements, a wire extending between the controllable element and the individual control means, and a flexible sheath surrounding a portion of the length of the wire between the individual control means and the movable cross head, said individual hand control means adapted to move said wires independently of said sheaths, each of said sheaths being immovable at one end and attached for movement with said movable cross head at the other end, each sheath including a bow between the ends, whereby actuation of the foot operated means adjusts the controllable elements in unison preserving the relative adjustments of said elements made by the hand control means and permitting independent adjustment of the controllable elements by said hand control means.

3. A control arrangement comprising a plurality of units; each unit comprising individual hand control means, a controllable element, a wire connecting the hand control means with a controllable element, a flexible sheath closely surrounding the wire for a portion of the length of the wire; said individual hand control means adapted to move said wires independently of said sheaths to relatively adjust the controllable elements with respect to each other, and a foot operated master control means, said flexible sheaths being immovable at one end and attached for movement with the master control means at the other, said flexible sheaths and that portion of the wires located therein being bowed, whereby actuation of the foot operated master control means causes the sheaths to flex and grippingly engage said wires to move all the wires an equal distance axially to regulate said controllable elements in unison in a manner preserving the relative adjustment between said controllable elements.

4. A control arrangement comprising a plurality of units; each unit comprising at least one controllable element, at least one individual control means, a wire connecting said individual control means to at least one controllable element, a flexible sheath surrounding the wire for a portion of the length of the wire; and a master control means intermediate the ends of said wires, said flexible sheaths being fixed against axial movement at one end and attached to the master control means at the other, operation of said individual control means causing axial movement of said wires relative to said sheath, said flexible sheaths and wires being arranged to cooperate so that axial movement of the sheaths by said master control means produces a corresponding axial movement of the wires, whereby movement of the master control means regulates the controllable elements in unison while preserving the relative controllable element settings obtained by the individual control means.

5. A control arrangement comprising a plurality of units; each of said units comprising individual control means, a controllable element, at least one wire connecting the individual control means with the controllable element, a flexible sheath surrounding each wire for a portion of the length of the wire, operation of said individual control means causing movement of said wires relative to said sheaths to adjust said controllable elements individually; and a master control means intermediate the ends of said wires, said flexible sheaths being fixed at one end against axial movement and attached to the master control means at the other end for axial movement therewith, said flexible sheaths and said wires being bowed in a portion located between the fixed end and the master control means, whereby axial movement of said master control means moves said flexible sheaths axially and causes them to flex and to move the portions of the wires between the master control means and the controllable elements in unison with said master control means to adjust the controllable elements in a manner preserving the relationship between the controllable elements established by the individual control means.

6. A control arrangement comprising a plurality of units; each of said units comprising a controllable element, an individual control means, a wire connecting the individual control means with the controllable element, a flexible sheath surrounding the wire for a portion of the length of the wire, and a master control means intermediate the ends of said wires, operation of said individual control means causing axial movement of said wires relative to said sheaths, one end of each flexible sheath being attached to the master control means for axial movement thereby, said flexible sheaths and said wires being bowed in a portion located between the individual control means and the master control means, whereby said sheaths are flexed and moved axially by movement of said master control means, the axial movement of said flexed sheaths causing unified movement of that portion of all the wires located between the master control and the controllable elements, in a manner preserving the relative adjustments established by the individual control means.

7. A control arrangement comprising a master control; a plurality of units; each unit comprising an individual control operative independently of said master control, a controllable element, a wire extending between the individual control and the controllable element, and a flexible sheath surrounding the wire for a portion of the length of the wire, individual control means for moving said wires independently of said sheaths, said sheaths being fixed against axial movement at one end and attached to the master control at the other whereby the master control imparts axial movement to said sheaths, and said sheaths move said wires axially.

References Cited in the file of this patent

UNITED STATES PATENTS

| | | |
|---|---|---|
| 1,701,906 | Bailhe | Feb. 12, 1929 |
| 2,313,000 | Hauguel | Mar. 2, 1943 |
| 2,579,959 | Petersen | Dec. 25, 1951 |

FOREIGN PATENTS

| | | |
|---|---|---|
| 228,604 | Great Britain | Feb. 2, 1925 |
| 656,628 | France | Jan. 2, 1929 |
| 717,945 | France | Oct. 26, 1931 |
| 819,047 | Germany | Oct. 29, 1951 |
| 1,009,222 | France | Mar. 5, 1952 |